(12) United States Patent
Matt et al.

(10) Patent No.: US 8,508,094 B2
(45) Date of Patent: Aug. 13, 2013

(54) SYNCHRONOUS ROTATING ELECTRICAL MACHINE WITH PERMANENT MAGNETS AND FLUX CONCENTRATION

(75) Inventors: Jean-Claude Matt, Dijon (FR); Jérome Legranger, Creteil (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 26 days.

(21) Appl. No.: 13/076,274

(22) Filed: Mar. 30, 2011

(65) Prior Publication Data

US 2012/0001511 A1    Jan. 5, 2012

(30) Foreign Application Priority Data

Mar. 31, 2010    (FR) ..................................... 10 52449

(51) Int. Cl.
*H02K 21/12*    (2006.01)
(52) U.S. Cl.
USPC ..................................................... 310/156.57
(58) Field of Classification Search
USPC ................... 310/156.49, 156.57, 156.78
See application file for complete search history.

(56) References Cited

U.S. PATENT DOCUMENTS

| | | | |
|---|---|---|---|
| 4,658,165 A * | 4/1987 | Vanderschaeghe | 310/156.57 |
| 5,378,953 A * | 1/1995 | Uchida et al. | 310/156.59 |
| 5,452,590 A * | 9/1995 | Vigili | 66/8 |
| 6,005,318 A * | 12/1999 | Pop, Sr. | 310/156.57 |
| 7,365,466 B2 * | 4/2008 | Weihrauch et al. | 310/156.78 |
| 7,923,881 B2 * | 4/2011 | Ionel et al. | 310/156.83 |

FOREIGN PATENT DOCUMENTS

JP    H01 146773 U    10/1989

OTHER PUBLICATIONS

Nicola Bianchi et al, "Salient-Rotor PM Synchronous Motors for an Extended Flux-Weakening Operation Range", IEEE Transactions on Industry Applications, Jul. 1, 2000, p. 1118-1125.

* cited by examiner

*Primary Examiner* — Dang Le
(74) *Attorney, Agent, or Firm* — Berenato & White, LLC

(57) ABSTRACT

A synchronous rotating electrical machine is disclosed, of the type including a stator (10) and a rotor (11). The rotor is of the flux concentration type and includes a plurality of alternate North and South poles formed from permanent magnets (PM). The magnets are housed in slots (E1) arranged in the magnetic body of the rotor. Each pole comprises a second slot (E3) roughly radial and arranged in the magnetic body of the pole, between two consecutive magnets delimiting the pole. In accordance with the invention, each pole includes a portion forming a bridge (BR) between the magnetic bodies of the rotor, on either side of the second slot, this part forming a bridge including a magnetic body height not greater than approximately one times the dimensional value of the width of the permanent magnets.

8 Claims, 4 Drawing Sheets

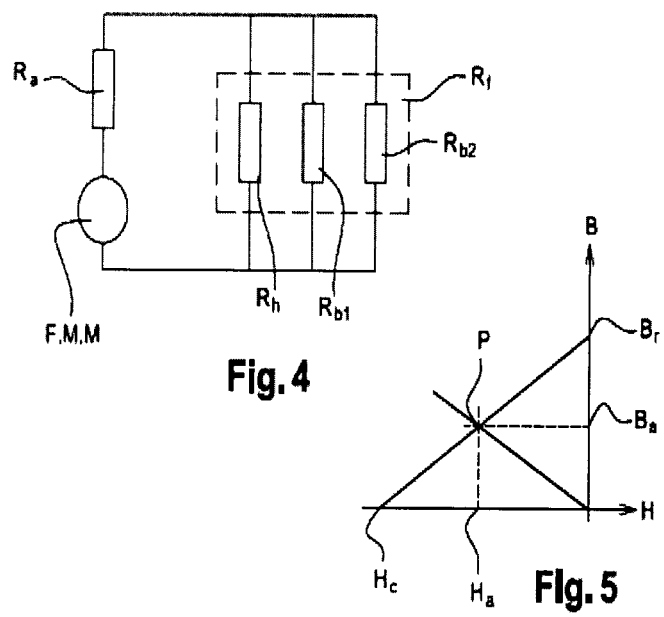
Fig. 4
Fig. 5
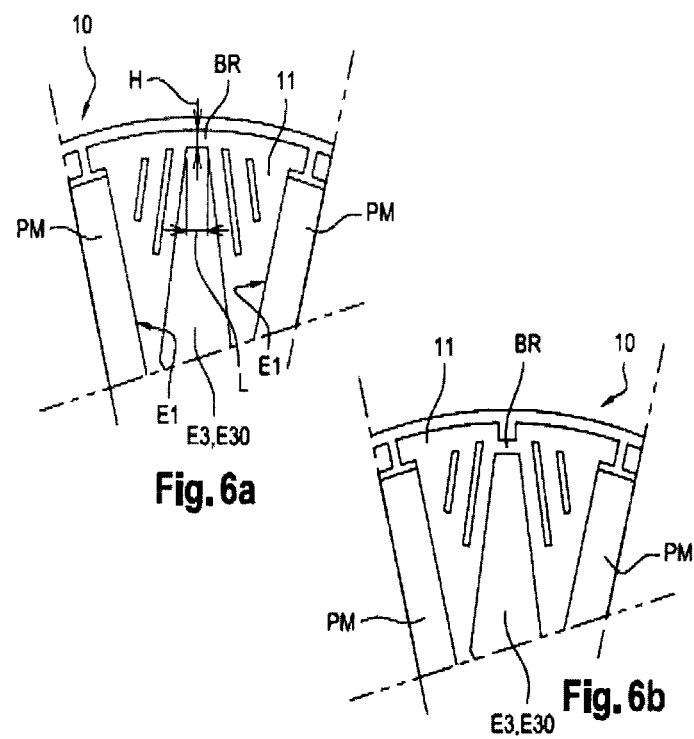
Fig. 6a
Fig. 6b

SYNCHRONOUS ROTATING ELECTRICAL MACHINE WITH PERMANENT MAGNETS AND FLUX CONCENTRATION

FIELD OF THE INVENTION

This application is a US Utility Patent Application, and claims priority to French patent application Ser. No. 10/52449 filed Mar. 31, 2010.

The present invention relates to a synchronous rotating electrical machine with permanent magnets and flux concentration. More particularly, the invention relates to a rotating electrical machine of this type for applications such as generators or electric traction engines in electric and hybrid automotive vehicles.

BACKGROUND OF THE INVENTION

Thanks to their improved performance in terms of output and power-to-weight and power-to-volume ratios, synchronous engines with permanent magnets are widely used today in the field of traction in automotive vehicles. Moreover, the availability of rare-earth permanent magnets on a large scale and under acceptable economic conditions makes the choice of such electric engines viable for new generations of automotive vehicles.

Such electric engines can be produced in a wide range of powers and speeds and will find applications in all-electric vehicles and in low $CO_2$ vehicles of the types known as "mild-hybrid" and "full-hybrid".

"Mild-hybrid" applications generally concern electric engines of the order of 8 to 10 KW, for example, an electric engine mounted at the front of a heat engine and coupled to it by a drive belt. It is possible with such an electric engine to reduce the thermal cubic capacity (engine downsizing) by providing torque electrical assistance which supplies auxiliary power especially when accelerating. Moreover, low-speed traction, for example in an urban environment, can also be provided by this same electric engine. Applications of the "full-hybrid" type generally concern engines of 30 to 50 KW for architectures of the series and/or parallel type with a more successful level of integration of the electric engine or engines in the vehicle's traction chain.

Among the known different synchronous engines with permanent magnets those of the flux concentration type are of particular interest owing to their excellent performance. In these flux concentration engines, the magnets are buried in the magnetic body of the rotor and arranged according to a roughly radial configuration.

In an automotive vehicle, an electric engine used in traction on all of the vehicle's circulation tasks is subject to variable conditions of speed and charge. A strategy of maximum torque control complemented by a defluxing strategy (also called "demagnetisation strategy") to achieve the high speed zone seems to be a good solution for controlling the electric engine.

SUMMARY OF THE INVENTION

To achieve the above objective, it is desirable to provide synchronous rotating electrical machines with permanent magnets and flux concentration which are optimised with torque and mechanical inertia. Maximum mechanical torque must be provided by the machine and the minimum inertia of the rotor especially to facilitate increases in speed.

According to a first aspect, the present invention relates to a rotating electrical machine comprising a stator equipped with stator windings and a rotor, the rotor comprising a plurality of alternate North poles and South poles which are formed from permanent magnets arranged according to a roughly radial configuration known as with flux concentration, first slots arranged in the magnetic body of the rotor and in which are housed respectively the permanent magnets; the rotor comprising, in each of its poles, a second slot arranged roughly radially in the magnetic body of the pole concerned, between two consecutive permanent magnets delimiting the pole, the second slot participant in a reduction in the mechanical inertia of the rotor; the rotor comprising, in each of its poles, a portion forming a bridge between two adjacent parts of the magnetic body of the rotor on either side of the second slot, and the permanent magnets being roughly rectangular in shape with a height in the radial direction of the rotor, a length in the axial direction of the rotor and a width having predetermined dimensional values.

In accordance with the invention, the part forming a bridge comprises a magnetic body height not greater than approximately one times the dimensional value of the width of the permanent magnets.

According to a particular characteristic of the invention, the part forming a bridge comprises a magnetic body height greater than approximately one times the unit metal sheet thickness of the packet of metal sheets forming the magnetic body of the rotor.

According to a further particular characteristic of the invention, the part forming a bridge comprises a magnetic body length less than approximately one and a half times the dimensional value of the width of the permanent magnets. Preferably, the magnetic body length of the part forming a bridge will be greater than approximately one and a half times the unit metal sheet thickness of the packet of metal sheets forming the magnetic body of the rotor.

According to a further form of embodiment of the invention, the part forming a bridge is set back in relation to the circumferential surface of the rotor.

According to a further particular characteristic of the invention, the second slot comprises a top part which participates in a reduction in the mechanical inertia of the rotor and a bottom part which participates in controlling a defluxing magnetic flux through the central part of the rotor.

According to a further particular characteristic of the invention, the top part of the second slot has a roughly trapezoidal shape with a smaller side corresponding roughly to the part forming the bridge.

According to a further particular characteristic of the invention, the second slot is roughly off-centre, between the two consecutive permanent magnets delimiting the pole.

According to a further particular characteristic of the invention, the rotor comprises, on either side of a said second slot, at least one third slot contributing to reducing the inertia of the rotor and oriented roughly within the alignment of magnetic field lines.

According to a further aspect, the invention refers to a process for dimensioning a rotor of a rotating electrical machine as briefly defined below. In accordance with the invention, the part forming a bridge is defined dimensionally so as to obtain an optimum compromise between a maximum mechanical torque provided by the machine and a minimum mechanical inertia of the rotor.

Other characteristics and advantages of the invention will become apparent on reading the following description of a number of particular forms of embodiment, with reference to the figures below, in which:

BRIEF DESCRIPTION OF THE DRAWINGS

FIG. 4 shows a network of reluctances of a defluxing magnetic circuit for a permanent magnet of the rotor of the machine of FIG. 1;

FIG. 5 is a magnetisation curve of the magnets showing the working point of these latter at the intersection of their straight line of charge;

FIGS. 6a and 6b show respectively first and second embodiments of a portion forming a bridge between two adjacent parts of the magnetic body of the rotor, on either side of a slot E3;

FIG. 1 shows the structure of a particular form of embodiment 1 of a defluxable rotating electrical machine according to the invention. The machine 1 is of the type with buried magnets and flux concentration and comprises a stator 10 and a rotor 11.

DETAILED DESCRIPTION

Figure 1:
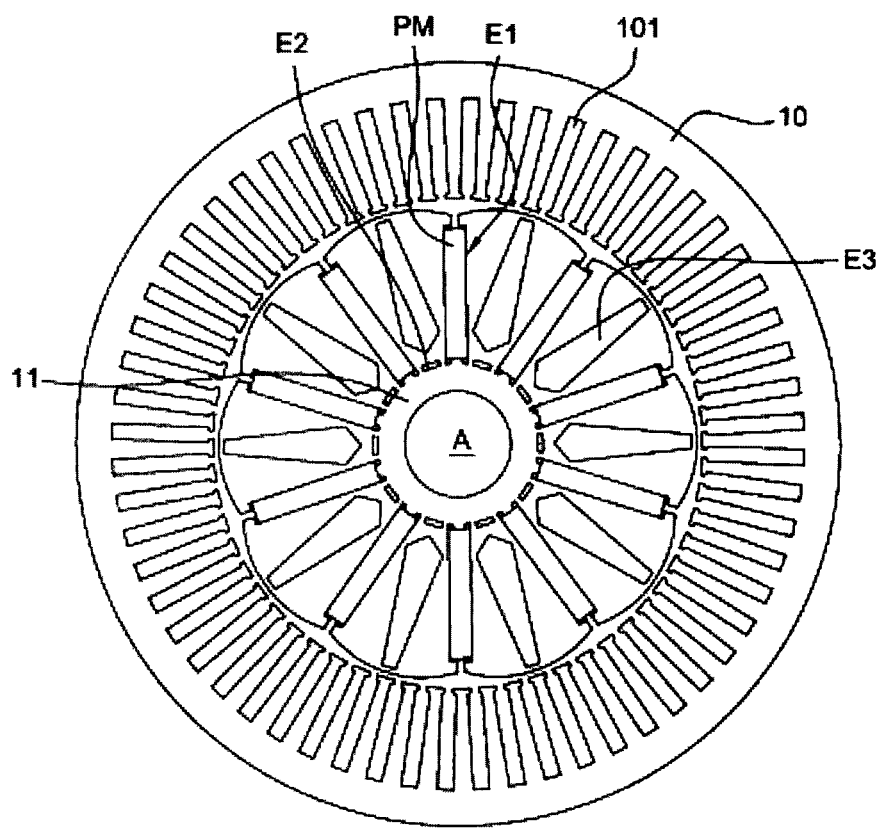
FIG. 1 shows, in a simplified fashion, the structure of a particular form of embodiment of a defluxable rotating electrical machine with permanent magnets and flux concentration according to the invention.

A concrete embodiment of such a machine according to the invention is for example a traction engine of 8 to 10 KW for applications in automotive vehicles of the type known as "mild-hybrid". A particular form of embodiment of this engine comprises a stator 10 having 60 recesses 101 and a rotor 11 comprising 10 alternate North and South poles. The rotor 11 has a diameter of the order of 100 mm and an axial length of the order of 50 mm. The rotor 11 comprises 10 permanent magnets PM having a roughly rectangular shape and with the dimensions: length ($L_{zs}$)×height ($h_a$)×width ($l_a$) =50 mm×25 mm×5 mm.

The stator 10 and the rotor 11 are traditionally equipped with packets of metal sheets forming magnetic bodies thereof.

The recesses 101 of the stator 10 are provided to receive stator windings (not shown) and form between them a plurality of stator teeth. Depending on the forms of embodiment, the recesses 101 will be provided to house concentrated windings, wound on large teeth, or distributed windings.

The rotor 11 has the general shape of a multi-lobed cylinder, each of the lobes corresponding to a magnetic pole of the rotor.

The magnets PM are arranged radially so as to obtain a rotor structure of the flux concentration type. In certain forms of embodiment, the magnets PM may be slightly unbalanced in relation to the radius of the rotor 11. The magnets PM are preferably rare-earth permanent magnets such as magnets of the Neodymium Iron Boron (NeFeB), Samarium-Iron (SmFe) or Samarium-Cobalt (SmCo) type or magnets obtained from sintered or bonded ferrites.

The rotor 10 comprises a central bore emerging at its two facial extremities and designed to receive its drive shaft A. It will be noted that in the present invention the shaft A can be made of a magnetic or non-magnetic material according to the application envisaged.

The rotor 10 also comprises slots E1, E2 and E3 which are repeated for each pole and extend axially over roughly the entire length of the rotor.

Closing metal sheets, without the slots E1, E2 and E3, may be provided at the facial extremities of the rotor 11 in order to contribute to the assembly of the rotor 11. Soldering points (not shown) at the edge of the packet of metal sheets and through tie-rods (not shown), parallel to the central axis, are also provided for the assembly of the rotor 11. The through tie-rods are made of a magnetic or non-magnetic material, depending on the applications. Advantageously, the passage of the tie-rods through the packet of metal sheets of the rotor 11 can be made through the slots E3.

In this particular form of embodiment, the slots E1, E2 and E3 are each 10 in number, this number corresponding to the number N=10 of magnetic poles of the rotor 11.

The slots E1, E2 and E3 are now described in detail with reference also to FIGS. 2 and 3.

The slots E1 form quasi-rectangular housings for the permanent magnets PM. The slots E1 are not occupied entirely by the magnets PM and comprise parts left vacant which fulfil functions of reluctance and magnetic barrier for controlling the passage of the magnetic flux in the magnetic body of the rotor 11 and the magnets PM.

The slot E1 emerges on the external circumference of the rotor 11 by means of a recess E10. The recess E10 is extended axially along the length of the rotor 11 and thus delimits the pole in relation to the neighbouring pole. First and second tips B1, B2 are thus formed in adjacent poles, which are opposite each other and designed to retain the permanent magnet PM in its housing, by opposing the effect of the centrifugal force on the magnet PM.

A reluctant space E11 is also provided between the top edge of the magnet PM and the lower face of the tips B1, B2. This reluctant space E11 is a space of the slot E1 left vacant by the magnet PM.

Figure 3:
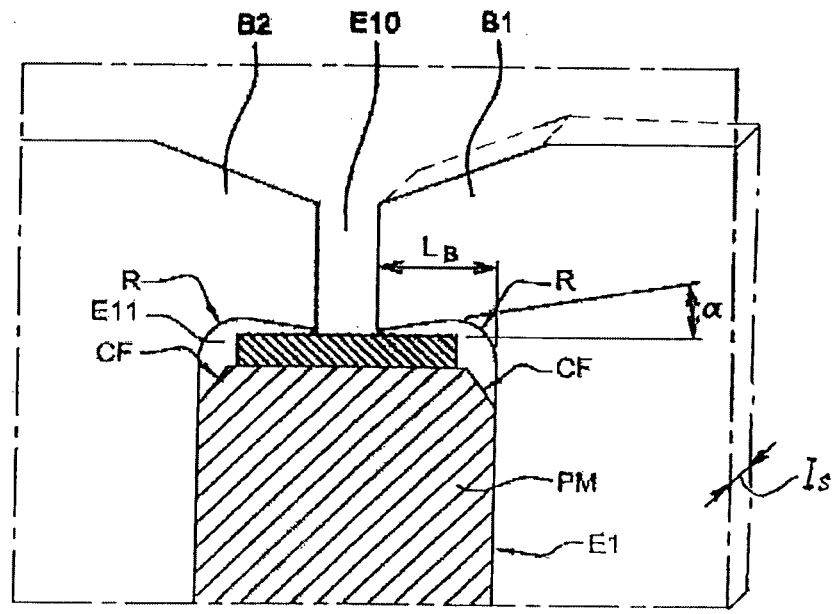
FIG. 3 shows a configuration of mounting of the permanent magnets, incorporating a strip, at the top extremity of the magnets.

FIG. 3 shows details of a mounting of the permanent magnet PM in the tips B1 and B2. This mounting in FIG. 3 corresponds to a particular form of embodiment in which a strip LM is provided.

The strip LM is interposed between the upper face of the magnet PM and the lower faces of the tips B1, B2. The strip LM is for example made of charged plastic, in a resin of the glass fibre charged epoxy resin type, a composite material or a deformable non-magnetic metallic material. The strip has the function of spreading the mechanical efforts being exercised on the top of the magnet PM and the tips B1, B2 and of absorbing by deformation any displacement of the magnet PM. The tests carried out by the inventive entity have shown that the centrifugal forces being applied to the magnet PM can be significant. If the machine is subjected to a very high speed of rotation, the magnet PM tends to move away from the axis of rotation of the rotor 11, under the effect of the centrifugal force, and deformation of the tips B1, B2 towards the exterior of the rotor 11 could occur. The strip LM contributes to a better spread of the mechanical stresses between the tips B1, B2 and by absorbing by deformation any displacement of the magnet PM thus reduces the risk of a breakage of the magnet PM and/or of deformation of the tips B1, B2. The tests carried out have shown that a strip thickness of at least 0.1 mm is desirable for it to correctly fulfil its function.

In accordance with the invention, there is also provided an angle of inclination α of the lower face of the tip B1, B2, in relation to the upper face of the magnet PM. This inclination can for example be obtained by means of a chamfer which according to the application will have an angle of between $\alpha=0.1°$ and $\alpha=15°$.

Preferably, as shown in FIG. 3, there is associated with this chamfer of angle α a mechanical reinforcement obtained by means of a rounding of radius R. This rounding is made between the lower chamfered face of the tip B1, B2 and the related face, roughly radial, forming an interior wall of the magnet housing. The radius R will preferably have a value of between 0.2 and 0.9 times the depth $L_B$ of the tip B1, B2. For example, the radius R will be between approximately R=0.5 mm and approximately R=1.5 mm. As can be seen in FIG. 3, chamfers or equivalents (roundings) CF are provided in this form of embodiment on the upper part of the magnet PM so as to avoid contact on the edge of the magnet PM with the rounding of radius R. Reference will be made solely to the chamfers CF in the rest of the description and in the attached claims, in the knowledge that the term "chamfer" also covers the equivalents such as roundings.

The tests carried out by the inventive entity have shown that for the class of machines to which the invention applies, an angle α and a radius R in the ranges indicated above make it possible to obtain satisfactory results in terms of optimum resistance to the centrifugal forces being exercised in the range of speeds from 0 to 20000 rpm.

The strip LM allows a distribution of the mechanical efforts on the two tips B1 and B2 and can in certain cases make it unnecessary to chamfer the edges of the magnets PM when its thickness is sufficient.

It will be noted that the magnetic reluctances introduced by the recess E10 and the reluctant space E11, as well as participating in the general polarisation of the magnet PM, described later, oppose local demagnetisation of the magnet PM at the edges.

Figure 2:
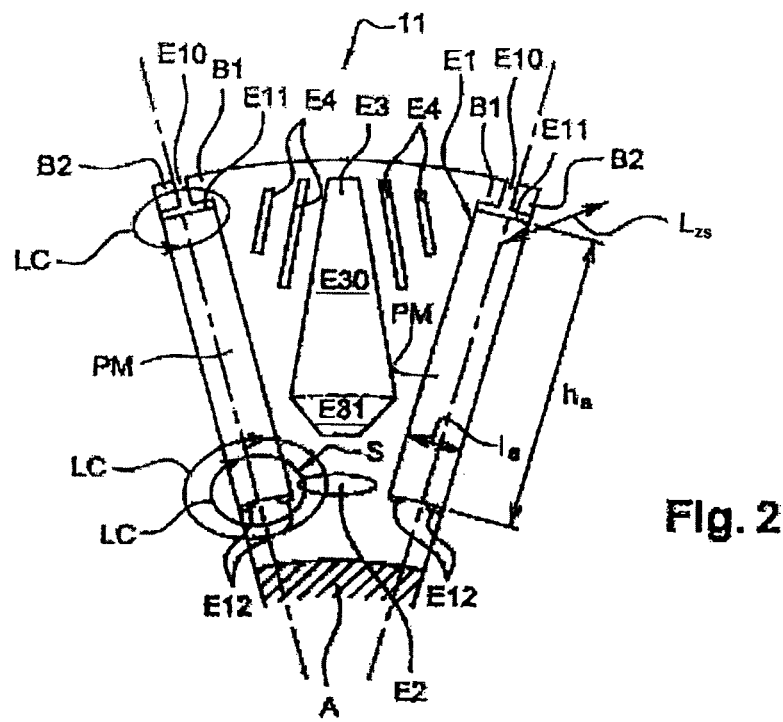
FIG. 2 shows the different slots embodied in the magnetic body of the rotor of the machine of FIG. 1.

As can be seen more particularly in FIG. 2, the slot E1 comprises in its bottom part, near to the shaft of the rotor 11, reluctant spaces E12 which are, in this form of embodiment, spaces filled with air, left vacant by the magnet PM and which on introducing a magnetic reluctance prevent local demagnetisations of the magnet PM.

The slots E2 essentially have a function of reluctance and magnetic barrier for controlling a defluxing magnetic flux through the central part of the rotor, in other words, in the magnetic body between the bottom of the magnets PM and the shaft A of the rotor.

It will be noted that these slots E2 are filled with air in this particular form of embodiment. In certain applications, they can be filled with magnetic or non-magnetic materials with a low relative permeability.

The slots E3 fulfil a number of functions. Generally speaking, their function is essentially to contribute, like the slots E2, to the control of the defluxing magnetic flux, through the central part of the rotor, and to reduce the inertia of the rotor 11. In this form of embodiment, like the recesses E10, the reluctant spaces E11, E12 and the slots E2, these slots E3 are filled with air. In certain applications, they can also be filled with non-magnetic, or magnetic, materials but with low density.

Although the slots E3 are represented here as being arranged radially in the rotor 11, centred between the consecutive magnets PM and symmetrical in shape, it will be noted that in other forms of embodiment of the invention, the slots E3 can, especially in their top part, be neither centred nor symmetrical in shape.

As shown especially in FIG. 2, other slots, labelled E4, are arranged in each pole, on either side of the slot E3. The slots E4 contribute to reducing the inertia of the rotor 11 and are situated within the alignment of the field lines, between them, so as to oppose to the least extent possible the passage of the magnetic flux of the magnets PM. In this form of embodiment, the slots E4 are two in number on either side of the slot E3. Generally speaking, the number of the slots E4 can vary according to the application and the room available. For example, their number can vary from 1 to 8, although 2 to 3 for the present invention is a good compromise.

Furthermore, it will be noted that the practical rules for cutting metal sheets impose the use of a width of material depending on the case of between 1 and 2 times a thickness $I_S$ of the metal sheet. In other words, this means, for example, that between two neighbouring slots of the rotor or between a slot and an external circumference of the rotor, there must be at least a width of material of between 1 and 2 times the thickness $I_S$ of the metal sheet. Thus, for example, for a metal sheet 0.35 mm thick, the minimum width of material to be conserved will be between 0.35 mm and 0.7 mm.

In this form of embodiment, the slot E3 comprises an upper trapezium E30 and a bottom part E31. Generally speaking, the upper trapezium E30 makes it possible to reduce the inertia of the rotor 11. However it has an effect on the magnetic reaction of the armature and can also be dimensioned so as to participate in the control thereof. The bottom part E31 is the part of the slot E3 which participates in the control of the defluxing magnetic flux through the central part of the rotor 11. The part E31, jointly with the reluctant spaces E12 and the slot E2, makes it possible to control the passage of the magnetic field lines in the central part of the rotor 11.

In accordance with the invention, the definition of the slots E31 and E2 from the study of the spread of the magnetic field lines in the pole makes it possible to obtain a defluxing magnetic circuit with optimum dimensions. This defluxing magnetic circuit must be dimensioned so as to permit a passage of the magnetic flux surrounding the magnet PM on the appearance of a situation of a short circuit in the stator windings, or when in high speed a current equal as a maximum to the short-circuit current is injected into the stator windings so as to oppose the magnetic flux generated by the permanent magnets.

Such a defluxing magnetic circuit prevents the appearance in the magnet PM of a demagnetising field with too high an amplitude, capable of producing irreversible demagnetisation of the magnet PM. The defluxing magnetic circuit must therefore be calculated so as to obtain correct polarisation of the magnet PM.

The equivalent magnetic circuit around a permanent magnet PM, in a situation of a short circuit in the stator windings, is represented in FIG. 4.

In a situation of a short circuit in the stator windings, the field lines LC (shown in FIG. 2) of the magnet PM do not pass through the stator of the machine. These field lines LC are then enclosed by means of a high magnetic reluctance Rh and low magnetic reluctances Rb1 and Rb2 of the magnetic circuit formed around the magnet PM.

The high magnetic reluctance Rh is that of the passage of the field lines LC through the tips B1, B2 and the recess E10. The low magnetic reluctance Rb1 is that of the passage of the field lines LC through the slots E2 on either side of the bottom of the magnet PM, in the two adjacent poles. The low magnetic reluctance Rb2 is that of the passages of the field lines LC through the ferrous constrictions S of the two poles, between the slots E2 and the opposing edges of the slots E1.

The constrictions formed by the portions B1, B2 and S function overall in saturation mode.

As shown in FIG. 4, the magnetic circuit comprises the source FMM in series with the internal reluctance $R_a$ and a magnetic reluctance of the defluxing circuit $R_f$ roughly equivalent to the three reluctances Rh, Rb1 and Rb2 in parallel.

With reference also to FIG. 5, a description is now given of the functioning of the permanent magnet PM in a short circuit situation.

For modern permanent magnets, for example of the NdFeB type, the magnetisation curve is roughly the shape of a straight line as shown in FIG. 5. This straight line is represented by the equation:

$$B_a = \mu_a \cdot H_a + B_r \quad (1)$$

in which $B_a$ is the magnetic induction of the magnet PM, $H_a$ is the magnetic field applied to PM, $B_r$ is the residual magnetic induction of PM and $\mu_a$ is the PM magnetic permeability.

The tests carried out by the inventive entity have shown that in order to avoid irreversible demagnetisation of the magnet PM, it is desirable to have a working point P satisfying the equation:

$$B_a = B_r/\lambda \quad (2)$$

with $\lambda$ having a minimum value between $\lambda_{min}$ and a maximum value $\lambda_{max}$, which, for magnets PM of the NdFeB type, have been determined to be equal to:

$\lambda_{min} = 1.7$ and
$\lambda_{max} = 2.5$

More generally, depending on the type of magnet, $\lambda$, can be between 1.3 and 4.

The close value of $\lambda = 2$ seems to be a good compromise in a short-circuit situation for a magnet PM.

For simplicity, it is assumed here that the permeability $\mu_a$ of the magnet PM is roughly equal to the absolute permeability $\mu_o = 4 \cdot \pi \cdot 10^{-7}$ H/m.

The reluctance of a rectangular magnet such as the magnet PM is given approximately by the formula:

$$R_a = l_a/(\mu_o \cdot h_a \cdot L_{ZS}) \quad (3)$$

in which, as shown in FIG. 2, $l_a$ is the width of the magnet PM, $h_a$ is the PM height and $L_{ZS}$ is the PM length.

The coercive field $H_c$ producing final demagnetisation of the magnet PM is given in first approximation by:

$$H_c = B_r/\mu_a \quad (4)$$

The magnetic flux $\phi_a$ generated by the magnet PM is given by the product of the magnetic induction and the surface, namely:

$$\phi_a = B_a \cdot L_{ZS} \cdot h_a \quad (5)$$

The magnetic flux $\phi_a$ is also given by the ratio:

$$\phi_a = FMM/(R_a + R_f) \quad (6)$$

The magnetomotive force of the magnet PM is given in first approximation by:

$$FMM = B_r \cdot l_a/\mu_a \quad (7)$$

From equations (5), (6) and (7), one obtains the equation:

$$B_a \cdot L_{ZS} \cdot h_a = (B_r \cdot l_a/\mu_a)/(R_a + R_f) \quad (8)$$

It follows from equation (8):

$$R_a + R_f = (l_a/(\mu_a \cdot L_{XS} \cdot h_a)) \cdot (B_r/B_a) \quad (9)$$

By introducing equations (2) and (3) into (9), one obtains:

$$R_a + R_f = R_a \lambda \quad (10)$$

This gives the ratio:

$$R_f/R_a = (\lambda - 1) \quad (11)$$

In the knowledge that $\lambda$ must be between $\lambda_{min}$ and $\lambda_{max}$, one obtains the inequation:

$$(\lambda_{min} - 1) \leq R_f/R_a \leq (\lambda_{max} - 1) \quad (12)$$

For magnets PM of the NdFeB type, with $\lambda_{min} = 1.7$ and $\lambda_{max} = 2.5$, one obtains the inequation:

$$0.7 \leq R_f/R_a \leq 1.5 \quad (13)$$

More generally, depending on the type of magnet, one obtains the inequation:

$$0.3 \leq R_f/R_a \leq 3 \quad (14)$$

Preferably, one will choose $R_f/R_a = 1$ which corresponds to $\lambda = 2$. In accordance with the invention, it is possible to determine values $\lambda_{min}$ and $\lambda_{max}$ for each type of magnet. Then, knowing the reluctance $R_a$ of the magnets PM chosen for the machine, an overall defluxing circuit reluctance $R_f$ can be determined from the inequation (12). Once the value of the overall defluxing circuit reluctance $R_f$ has been determined, it is possible to optimise the spread thereof between Rh, Rb1 and Rb2 so as to obtain the desired performance.

With reference now to FIGS. 6 to 10, a description is given below of the optimisation of a portion BR forming a bridge between two adjacent parts of the magnetic body of the rotor 11 on either side of the slot E3.

The tests carried out by the inventive entity have shown that the dimensioning of this bridge BR of the packet of rotor metal sheets is important in order, on one hand, to reduce the moment of inertia of the rotor 11 and, on the other hand, to be able to guarantee obtaining the maximum torque wanted for the machine.

As can be seen in FIGS. 6a and 6b, showing two different forms of embodiment, the bridge BR is defined dimensionally by its height H and by its length L.

Such a bridge BR is necessary for reasons of mechanical resistance of the rotor 11. In the forms of embodiment in FIGS. 6a and 6b, the bridge BR is continuous over the entire axial length of the rotor 11, such that the slot E3 does not emerge at any point of the circumferential surface of the rotor 11. In the form of embodiment of FIG. 6b, the bridge BR is set back in relation to the circumferential surface of the rotor and a wider gap is obtained in the bridge BR between the stator 10 and the rotor 11. In other forms of embodiment of the invention not represented, the bridge BR can be made discontinuous by letting the slot E3 emerge on the exterior, at the circumferential surface of the rotor 11, for example, one metal sheet in two.

It will be noted that the form of embodiment of FIG. 6b with a bridge BR set back and the forms of embodiment indicated above with a discontinuous bridge BR can be interesting in certain applications, in order to reduce iron losses by a reduction of harmonics in the magnetomotive force. In the forms of embodiment described here, the variable gap between the rotor 11 and the stator 10, visible in FIGS. 1, 6a and 6b, also contributes to a reduction of harmonics and therefore in iron losses.

Figure 7:
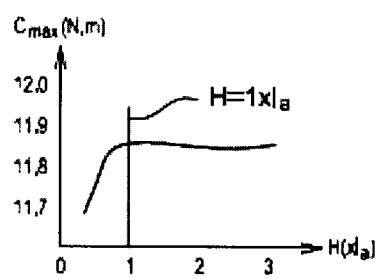
FIGS. 7 and 8 are respectively torque and inertia curves as a function of a height H of the portion forming a bridge of FIGS. 6a and 6b.
Figure 8:
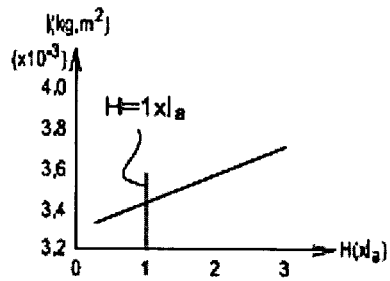

With reference to FIGS. 7 and 8, the tests carried out by the inventive entity show that a good compromise between a maximum torque (Cmax) and a minimum inertia (I) will be obtained for a height H of the bridge BR which must remain less than approximately 1 times the width $l_a$ ($1 \times l_a$) of the permanent magnets PM.

As shown in FIG. 7, the torque $C_{max}$ is achieved for a height H of $1 \times l_a$. Moreover, as can be seen in FIG. 8, a height H greater than $1 \times l_a$ will only result in increasing the inertia I without any gain of torque.

On a practical level, bearing in mind the rules for cutting metal sheets indicated earlier in the description, the height H of the bridge BR will be between approximately 1 times the thickness $I_S$ of the metal sheet and approximately 1 times the width of the magnet $l_a$. Thus, for example, with metal sheets having a thickness of 0.35 mm and magnets having a width of 5 mm, the height of the bridge BR according to the invention will here be between approximately 0.35 mm and approximately 5 mm.

Figure 9:
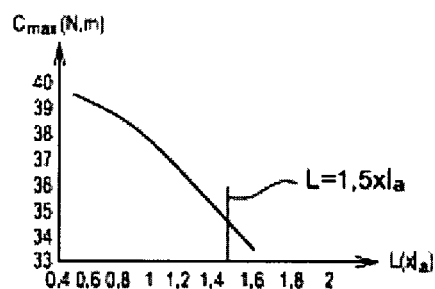
FIGS. 9 and 10 are respectively torque curves of the machine and inertia curves of the rotor as a function of a length L of the portion forming a bridge of FIGS. 6a and 6b.
Figure 10:
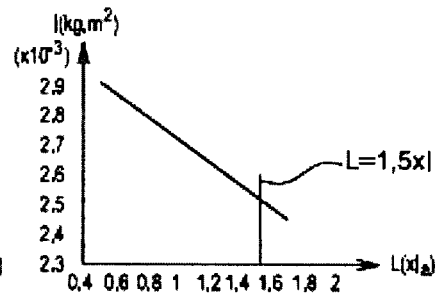

FIGS. 9 and 10 show curves of the torque Cmax and inertia I as a function of the length L of the bridge BR. The tests carried out by the inventive entity show that the best compromise of performance between a maximum torque and a minimum inertia will be obtained for a length L of the bridge BR of less than approximately 1.5 times the width $l_a$ ($1 \times l_a$) of the permanent magnets PM. On a practical level the minimum length L which the bridge BR can take will be of the order of 1.5 times the thickness $I_S$ of the metal sheet, namely 0.520 mm approximately for a metal sheet thickness of 0.35 mm.

The invention has been described here in the context of particular forms of embodiment. The invention will find significant applications in electric traction engines used in cars, for electric vehicles and hybrid vehicles. However, it must be clear that the invention will also find applications in fields other than the automotive field.

The invention claimed is:

1. A rotating electrical machine comprising:
a stator (10) equipped with stator windings and a rotor (11);
said rotor comprising a plurality of alternate North poles and South poles formed from permanent magnets (PM) and arranged according to a substantially radial configuration so as to aid flux concentration, first slots (E1) arranged in a magnetic body of said rotor (11) so as to house said permanent magnets (PM);
said rotor further comprising, in each of said poles thereof, a second slot (E3) arranged substantially radially in said magnetic body of said rotor, between two consecutive of said permanent magnets (PM) delimiting said pole, said second slot (E3) realizing a reduction in the mechanical inertia of said rotor (11);
said rotor further comprising, in each of said poles thereof, a portion forming a bridge (BR) between two adjacent parts of said magnetic body of said rotor (11) on either side of said second slot (E3), and said permanent magnets (PM) being approximately rectangular in shape with a height ($h_a$) in the radial direction of said rotor (11), a length ($L_{zs}$) in the axial direction of said rotor (11) and a width ($I_a$) having predetermined dimensional values;
said portion forming said bridge (BR) comprising a magnetic body height (H) not greater than approximately the dimensional value of said width ($I_a$) of said permanent magnets (PM);
said magnetic body height (H) being greater than approximately a unit metal sheet thickness of a packet of metal sheets forming the magnetic body of said rotor (11).

2. The rotating electrical machine according to claim 1, wherein said portion forming said bridge (BR) comprises a magnetic body length (L) less than approximately one and a half times the dimensional value of said width ($l_a$) of said permanent magnets (PM).

3. The rotating electrical machine according to claim 1, wherein said portion forming said bridge (BR) is set back in relation to a circumferential surface of said rotor (11).

4. The rotating electrical machine according to claim 1, wherein said second slot (E3) comprises a top part (E30) which participates in a reduction in the mechanical inertia of said rotor (11) and a bottom part (E31) which participates in controlling a defluxing magnetic flux through a central part of said rotor (11).

5. The rotating electrical machine according to claim 4, wherein said top part (E30) has a approximately trapezoidal shape with a smaller side corresponding roughly to said portion forming said bridge (BR).

6. The rotating electrical machine according to claim 1, wherein said rotor (11) comprises, on either side of said second slot (E3), at least one third slot (E4) reducing the inertia of said rotor (11) and oriented approximately within the alignment of magnetic field lines.

7. A rotating electrical machine, comprising:
a stator (10) equipped with stator windings and a rotor (11);
said rotor comprising a plurality of alternate North poles and South poles formed from permanent magnets (PM) and arranged according to a substantially radial configuration so as to aid flux concentration, first slots (E1) arranged in a magnetic body of said rotor (11) so as to house said permanent magnets (PM);
said rotor further comprising, in each of said poles thereof, a second slot (E3) arranged substantially radially in said magnetic body of said rotor, between two consecutive of said permanent magnets (PM) delimiting said pole, said second slot (E3) realizing a reduction in the mechanical inertia of said rotor (11);
said rotor further comprising, in each of said poles thereof, a portion forming a bridge (BR) between two adjacent parts of said magnetic body of said rotor (11) on either side of said second slot (E3), and said permanent magnets (PM) being approximately rectangular in shape with a height ($h_a$) in the radial direction of said rotor (11), a length ($L_{zs}$) in the axial direction of said rotor (11) and a width ($I_a$) having predetermined dimensional values;
said portion forming said bridge (BR) comprising a magnetic body height (H) not greater than approximately the dimensional value of said width ($I_a$) of said permanent magnets (PM);
said part forming a bridge (BR) comprising a magnetic body length (L) greater than approximately one and a half times a unit metal sheet thickness of a packet of metal sheets forming said magnetic body of said rotor (11).

8. A method for dimensioning a rotor of a rotating electrical machine comprising a stator (10) equipped with stator windings and a rotor (11), said rotor comprising a plurality of alternate North poles and South poles formed from permanent magnets (PM) arranged according to a substantially radial configuration known as with flux concentration, first slots (E1) arranged in a magnetic body of said rotor (11) so as to house said permanent magnets (PM); said rotor further comprising, in each of said poles thereof, a second slot (E3) arranged substantially radially in the magnetic body of said rotor, between two of said consecutive permanent magnets (PM) delimiting said pole, said second slot (E3) participating in a reduction in the mechanical inertia of said rotor (11); and said rotor further comprising, in each of said poles thereof, a portion forming a bridge (BR) between two adjacent parts of said magnetic body of said rotor (11) on either side of said second slot (E3); the method comprising the step of: selecting said portion forming said bridge (BR) such that said bridge is defined dimensionally (H, L) such that a magnetic body height (H) of said bridge (BR) is not greater than approximately the dimensional value of a width ($l_a$) of said permanent magnets (PM) and a magnetic body length (L) thereof is less than approximately one and a half times the dimensional value of said width of said permanent magnets, so as to obtain an optimum compromise between a maximum mechanical torque (Cmax) provided by said electrical machine and a minimum mechanical inertia of said rotor (11);

said magnetic body height (H) being greater than approximately a unit metal sheet thickness of a packet of metal sheets forming the magnetic body of said rotor (11).

\* \* \* \* \*